US008942757B2

United States Patent
Jia et al.

(10) Patent No.: US 8,942,757 B2
(45) Date of Patent: Jan. 27, 2015

(54) DEVICE AND METHOD FOR BASE STATIONS DYNAMIC CLUSTERING IN MOBILE COMMUNICATION

(75) Inventors: Yunjian Jia, Yokohama (JP); Kenzaburo Fujishima, Kokubunji (JP); Hideya Yoshiuchi, Beijing (CN); Peng Yang, Beijing (CN); Yuanchen Ma, Beijing (CN); Lu Geng, Beijing (CN); Sheng Zhou, Beijing (CN); Zhisheng Niu, Beijing (CN); Jie Gong, Beijing (CN)

(73) Assignee: Hitachi, Ltd., Tokyo (JP)

( * ) Notice: Subject to any disclaimer, the term of this patent is extended or adjusted under 35 U.S.C. 154(b) by 553 days.

(21) Appl. No.: 13/266,898

(22) PCT Filed: Apr. 29, 2010

(86) PCT No.: PCT/CN2010/072341
§ 371 (c)(1),
(2), (4) Date: Dec. 5, 2011

(87) PCT Pub. No.: WO2010/124647
PCT Pub. Date: Nov. 4, 2010

(65) Prior Publication Data
US 2012/0094710 A1   Apr. 19, 2012

(30) Foreign Application Priority Data

Apr. 30, 2009   (CN) .......................... 2009 1 0132283

(51) Int. Cl.
*H04W 4/00*   (2009.01)
*H04W 24/02*   (2009.01)
(Continued)

(52) U.S. Cl.
CPC ............ *H04W 72/044* (2013.01); *H04B 7/024* (2013.01); *H04W 72/0426* (2013.01); *H04W 92/20* (2013.01)
USPC ........................ 455/524; 455/450; 455/452.2

(58) Field of Classification Search
None
See application file for complete search history.

(56) References Cited

U.S. PATENT DOCUMENTS

2004/0117226 A1* 6/2004 Laiho et al. ....................... 705/7
2008/0014884 A1   1/2008 Oyman et al.
(Continued)

FOREIGN PATENT DOCUMENTS

CN   101389115 A   3/2009
CN   101415207 A   4/2009
(Continued)

OTHER PUBLICATIONS
LG Electronics, "Dynamic Cell Clustering for CoMP", Feb. 9, 2009, Athens, Greece.
(Continued)

*Primary Examiner* — Philip Sobutka
(74) *Attorney, Agent, or Firm* — Mattingly & Malur, PC

(57) ABSTRACT

Disclosed are a communication control device, a communication control method and the system thereof, which provide efficient multi-base station joint services in a mobile communication system using dynamic clustering. Optimal base station clustering is chosen according to the communication state between a terminal and each base station. The communication control device connects with multiple base stations through a network, and clusters the multiple base stations dynamically so that the clustered multiple base stations can provide services for the mobile terminal in union. The communication control device comprises: an interface, connecting with multiple base stations, receiving channel state information related to the mobile terminal from each base station; a memory unit, storing the channel state information of the mobile terminal received from the interface; a control unit, clustering each base station dynamically according to the channel state information of the mobile terminal stored in the memory unit.

13 Claims, 16 Drawing Sheets

(51) Int. Cl.
*H04W 72/04* (2009.01)
*H04B 7/02* (2006.01)
*H04W 92/20* (2009.01)

(56) References Cited

U.S. PATENT DOCUMENTS

2008/0030222 A1 2/2008 Jung
2008/0260064 A1 10/2008 Shen et al.
2010/0034151 A1* 2/2010 Alexiou et al. ............... 370/329

FOREIGN PATENT DOCUMENTS

JP 2009-278557 A 11/2009
JP 2010-246113 A 10/2010
WO 02/089356 A1 11/2002
WO 2008/157147 A1 12/2008

OTHER PUBLICATIONS

Japanese Office Action received in Japanese Application No. 2013-174757 dated May 16, 2014.

ETRI, Multi-cell PMI coordination for downlink CoMP, 3GPP R1-091490, 3GPP, Mar. 23, 2009.

* cited by examiner

— — — — INTERFACE AMONG BASE STATIONS WITHIN SAME COORDINATION SERVICE CLUSTER

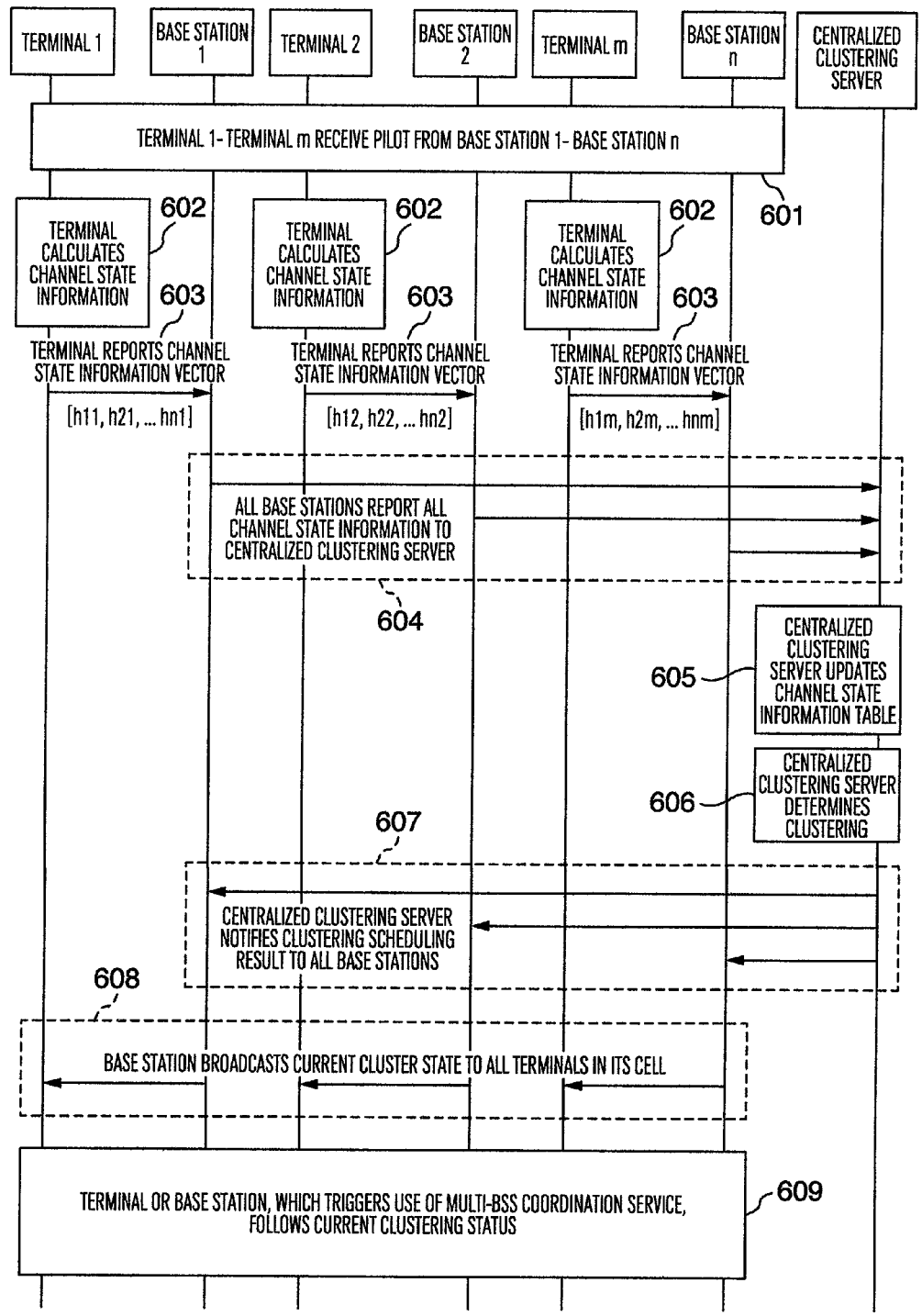

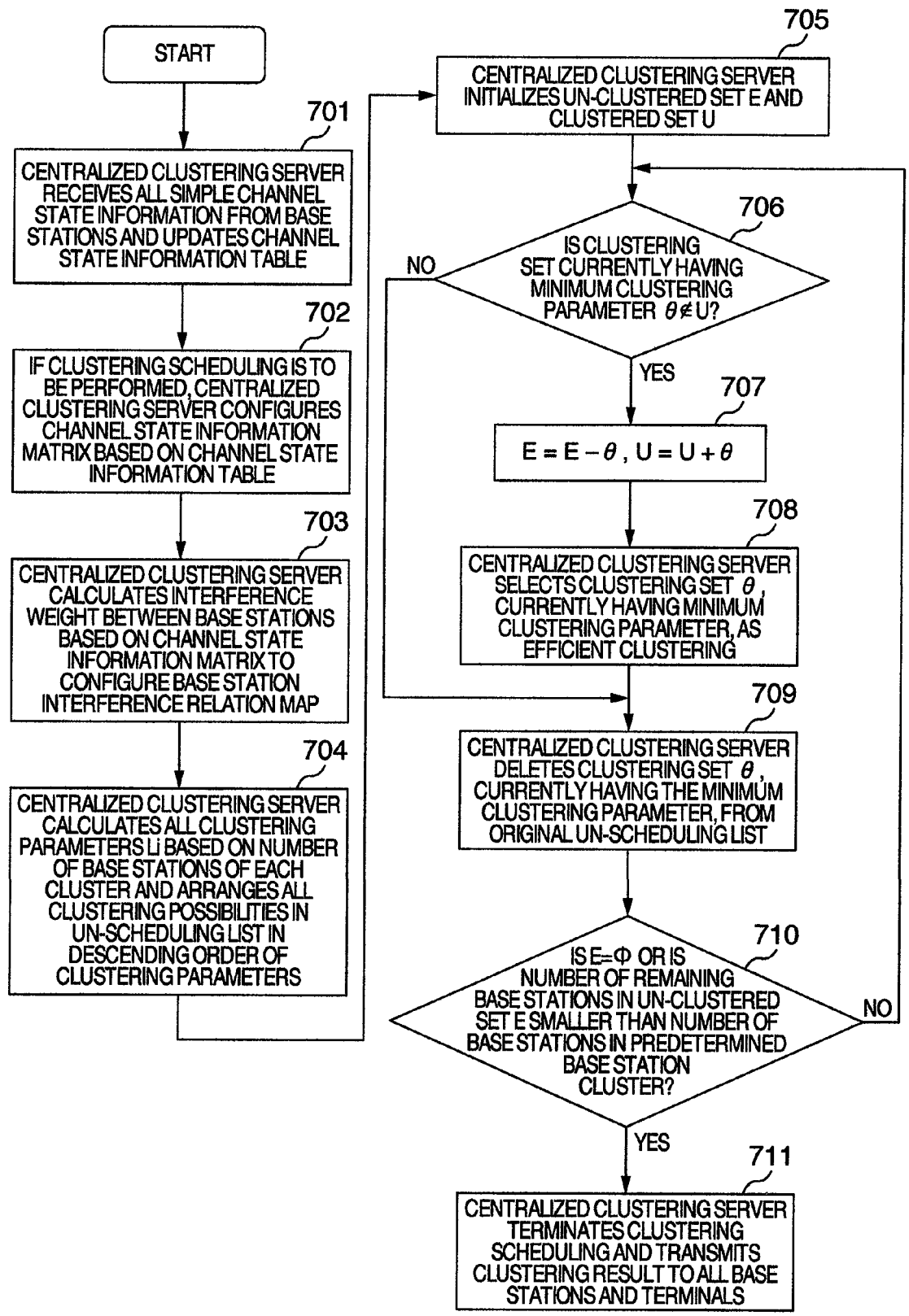

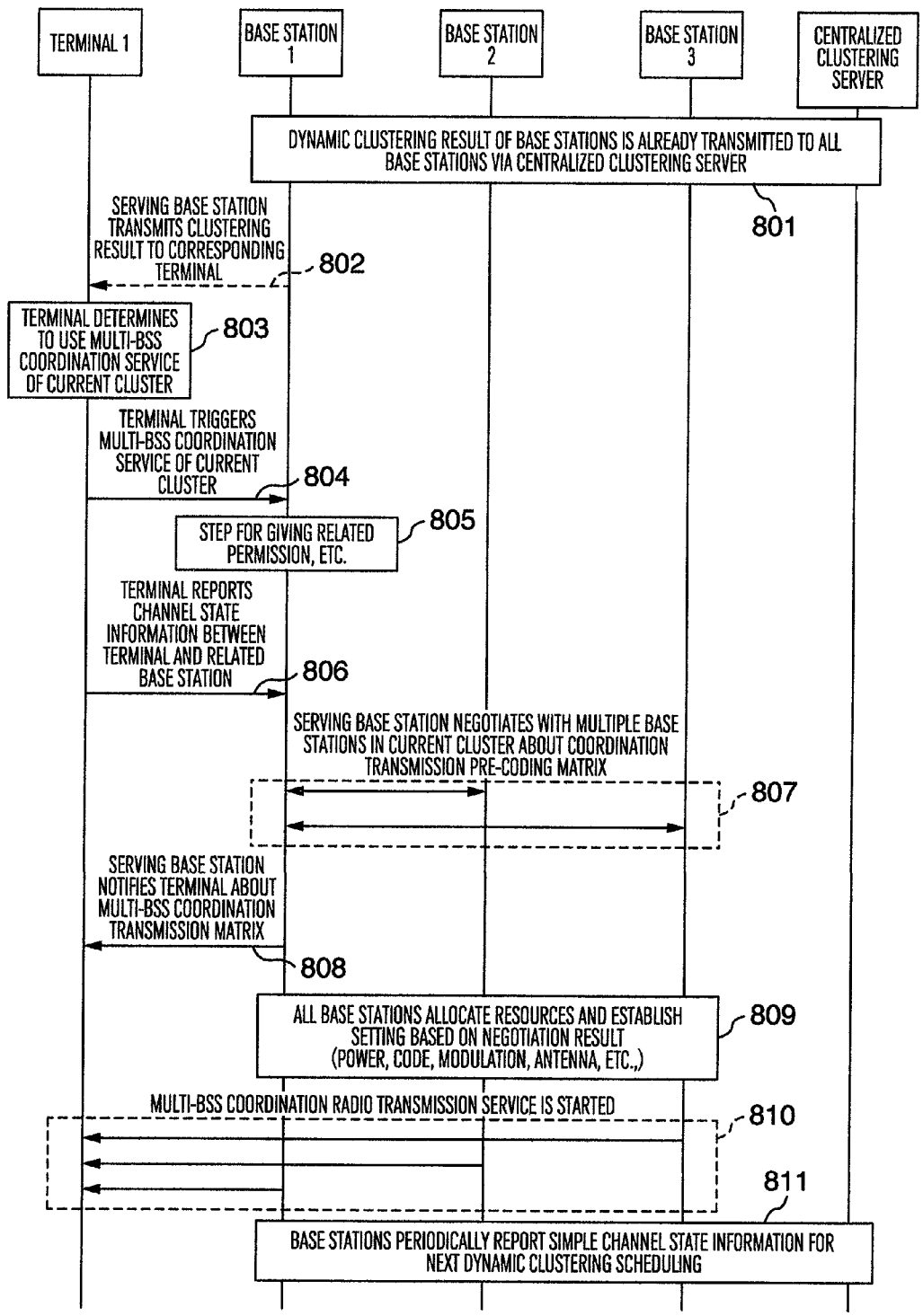

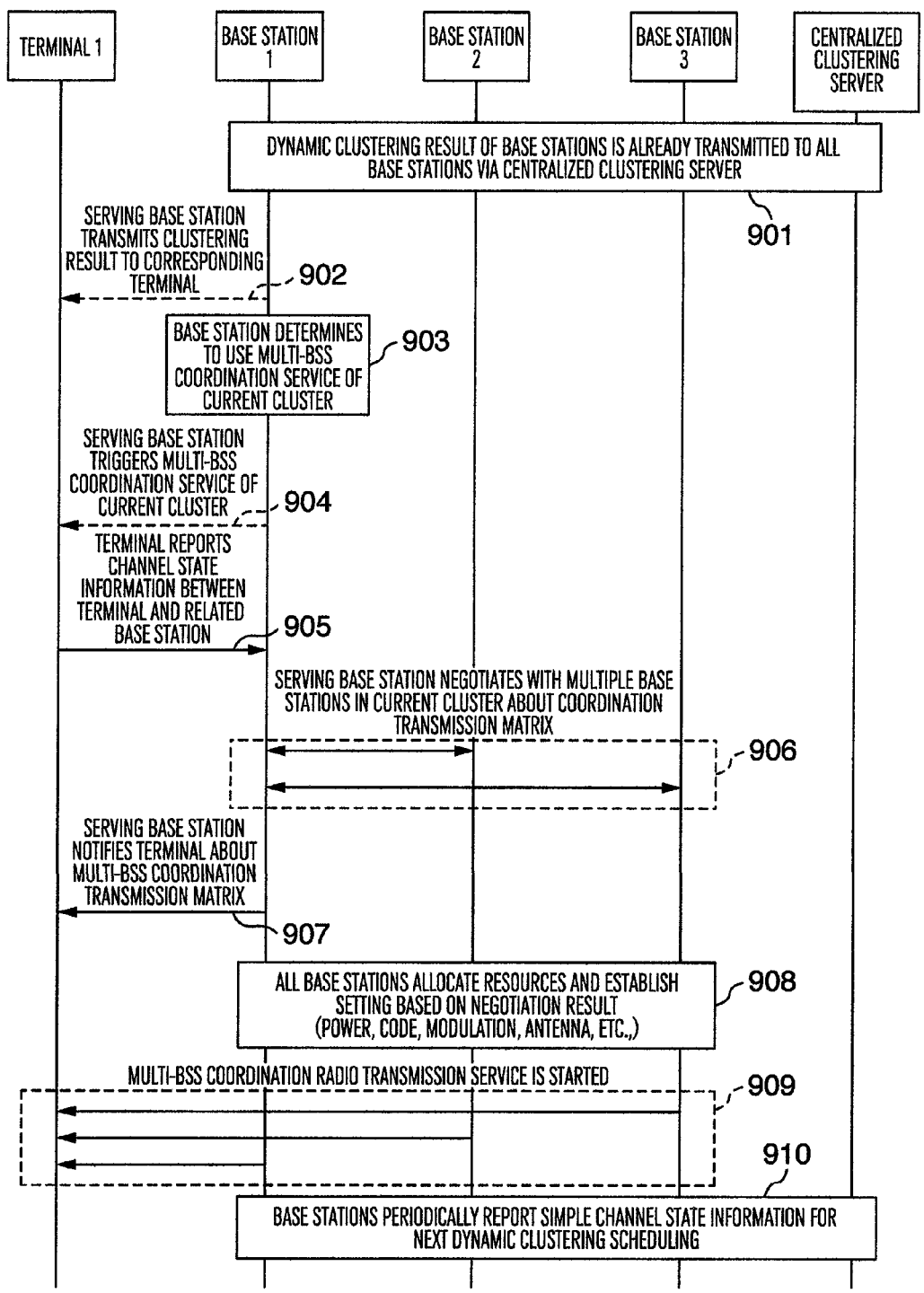

FIG.10

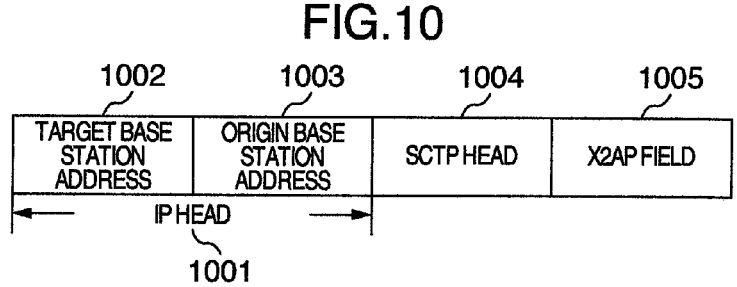

FIG.11

| INFORMATION UNIT | REQUIRED / OPTIONAL | BASIC CONTENTS AND REPRESENTATIVE NUMERIC VALUE OF INFORMATION UNIT | ADDITIONAL DESCRIPTION |
|---|---|---|---|
| 1101 | | | |
| MESSAGE TYPE 1102 | REQUIRED | MULTI-BSS COORDINATION SERVICE REQUEST | |
| X2AP PROTOCOL NUMBER CORRESPONDING TO TERMINAL OF SERVING BASE STATION 1103 | REQUIRED | INTEGER (1..4095, ...) | THIS NUMBER UNIQUELY IDENTIFIES ONE TERMINAL IN THE DIRECTION FROM SERVING BASE STATION TO TARGET BASE STATION |
| TARGET BASE STATION NUMBER 1104 | REQUIRED | INTEGER (1..4095, ...) | |
| RELATED CELL ID OF TARGET BASE STATION 1105 | REQUIRED | INTEGER (1..4095, ...) | |
| REQUEST TYPE OF MULTI-BSS SERVICE 1106 | REQUIRED | ENUMERATION VALUE (START, STOP, ...) | |
| CONTENTS OF REQUEST REPORT 1107 | REQUIRED | BIT SEQUENCE (WORD LENGTH (32)) | EACH IDENTIFICATION BIT INDICATES ONE RELATED INFORMATION UNIT. THE TARGET BASE STATION MUST REPORT LISTED INFORMATION UNITS TO THE SERVING BASE STATION FOR NEGOTIATION. FOR EXAMPLE: FIRST BIT = PRE-DECODING OPTION SECOND BIT = OUTPUT POWER OF COORDINATION SERVICE THIRD BIT = MODULATION RATE ETC., |
| REPORTING PERIOD 1108 | OPTIONAL | ENUMERATION VALUE (1000ms, 2000ms, , ...) | |
| CHANNEL STATE INFORMATION BETWEEN TARGET BASE STATION AND TERMINAL 1109 | REQUIRED | QUANTIZED CHANNEL STATE VALUE | |
| OTHER OPTIONAL INFORMATION | OPTIONAL | | |

FIG.12

| INFORMATION UNIT | REQUIRED / OPTIONAL 1201 | BASIC CONTENTS AND REPRESENTATIVE NUMERIC VALUE OF INFORMATION UNIT | ADDITIONAL DESCRIPTION |
|---|---|---|---|
| MESSAGE TYPE 1202 | REQUIRED | MULTI-BSS COORDINATION RESPONSE | |
| X2AP PROTOCOL NUMBER CORRESPONDING TO TERMINAL OF SERVING BASE STATION 1203 | REQUIRED | INTEGER (1..4095,...) | THIS NUMBER UNIQUELY IDENTIFIES ONE TERMINAL IN THE DIRECTION FROM SERVING BASE STATION TO TARGET BASE STATION |
| X2AP PROTOCOL NUMBER CORRESPONDING TO TERMINAL OF TARGET SERVING BASE STATION 1204 | REQUIRED | INTEGER (1..4095,...) | THIS NUMBER UNIQUELY IDENTIFIES ONE TERMINAL IN THE DIRECTION FROM TARGET BASE STATION TO SERVING BASE STATION |
| RELATED CELL ID OF TARGET BASE STATION 1205 | REQUIRED | INTEGER (1..4095,...) | THIS FIELD IS ASSIGNED BY TARGET BASE STATION |
| REQUEST TYPE OF MULTI-BSS SERVICE 1206 | REQUIRED | ENUMERATION VALUE (START, STOP, ...) | THIS FIELD MUST CONTAIN THE SAME CONTENTS AS THOSE OF THE CORRESPONDING INFORMATION UNIT IN X2AP REQUEST MESSAGE |
| CONTENTS OF RESPONSE REPORT 1207 | REQUIRED | BIT SEQUENCE (WORD LENGTH (32)) | THIS FIELD MUST CONTAIN THE SAME CONTENTS AS THOSE OF THE CORRESPONDING INFORMATION UNIT IN X2AP REQUEST MESSAGE |
| REPORTING PERIOD 1208 | OPTIONAL | ENUMERATION VALUE (1000ms, 2000ms, ,...) | |
| PRE-CODING OPTION 1209 | OPTIONAL | COORDINATION TRANSMISSION PRE-CODING OPTION | |
| COORDINATION TRANSMISSION POWER 1210 | OPTIONAL | POWER ALLOCATED IN TARGET BS | |
| MODULATION RATE 1211 | OPTIONAL | 64QAM, 16QAM, QPSK..... | |
| OTHER OPTIONAL INFORMATION | OPTIONAL | | |

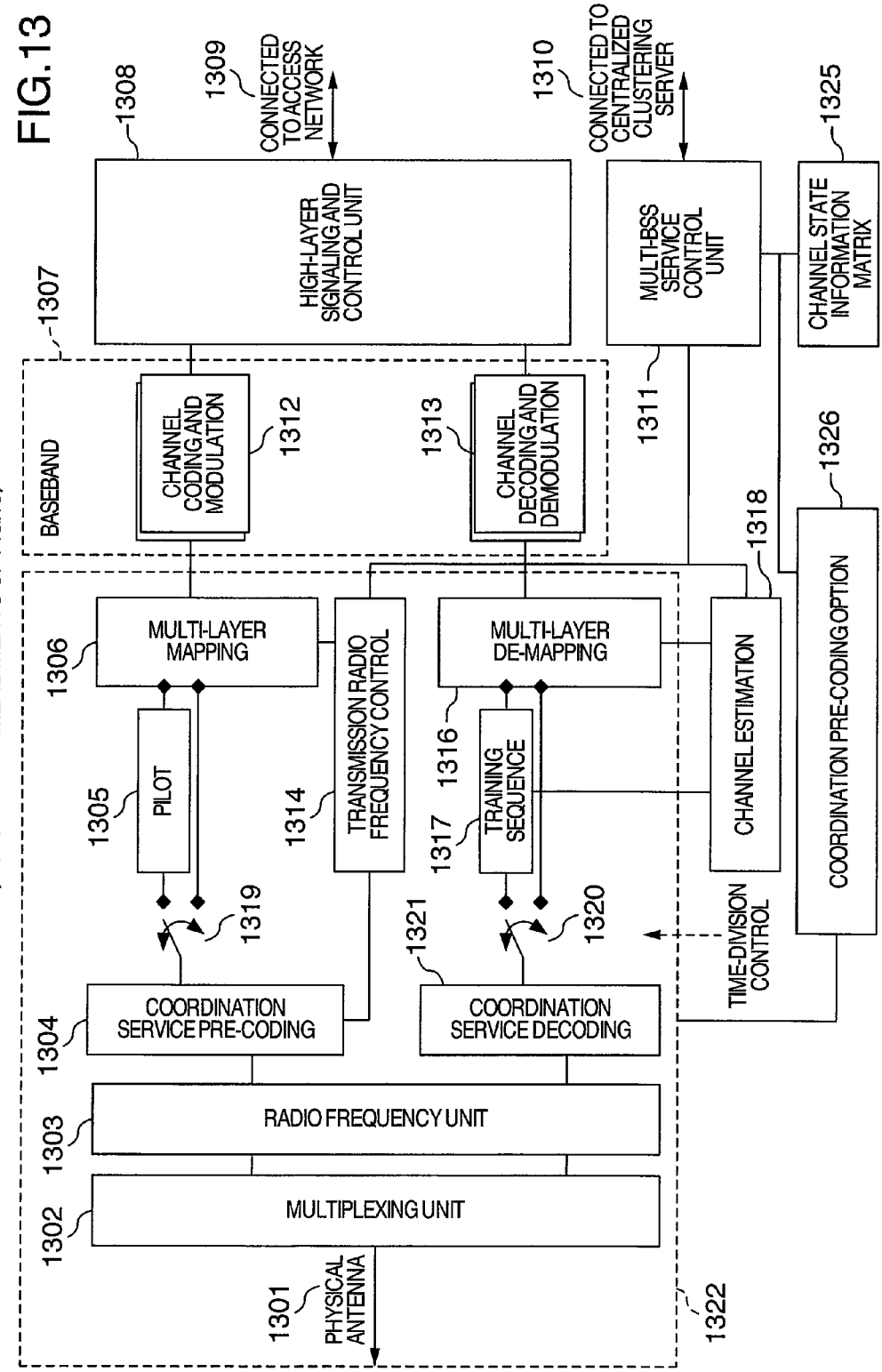

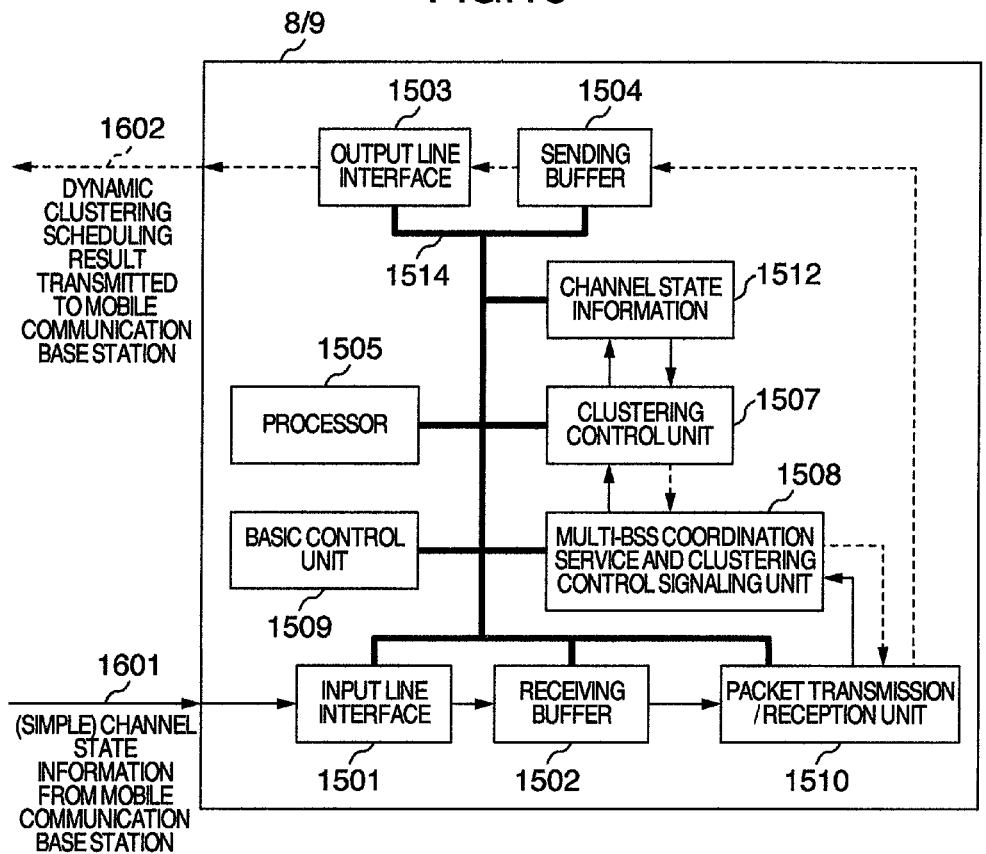

| TERMINAL | BS1 | | BS2 | | BS3 | | BS4 | |
|---|---|---|---|---|---|---|---|---|
| | CHANNEL STATE INFORMATION | IS BASE STATION A SERVING BASE STATION? (1/0) | CHANNEL STATE INFORMATION | IS BASE STATION A SERVING BASE STATION? (1/0) | CHANNEL STATE INFORMATION | IS BASE STATION A SERVING BASE STATION? (1/0) | CHANNEL STATE INFORMATION | IS BASE STATION A SERVING BASE STATION? (1/0) |
| TERMINAL 1 | 2.0 | 1 | 0.4 | 0 | 0 | 0 | 0.9 | 0 |
| TERMINAL 2 | 0 | 0 | 2.4 | 1 | 0.7 | 0 | 0 | 0 |
| TERMINAL 3 | 0 | 0 | 0.9 | 0 | 2.2 | 1 | 0 | 0 |
| TERMINAL 4 | 0.8 | 0 | 0 | 0 | 1.6 | 0 | 2.5 | 1 |
| TERMINAL 5 | 1.2 | 1 | 0 | 0 | 1.3 | 0 | 0 | 0 |

FIG.20

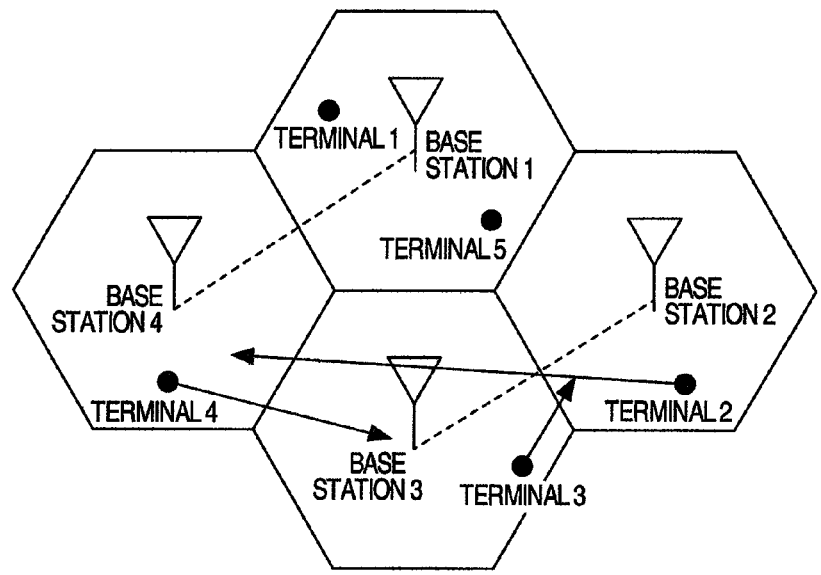

- - - - - - - - INTERFACE BETWEEN BASE STATIONS WITHIN SAME COORDINATION SERVER

───────▶ MOVEMENT DIRECTION AND DISTANCE OF TERMINAL

FIG.21

| TERMINAL | BS1 | | BS2 | | BS3 | | BS4 | |
|---|---|---|---|---|---|---|---|---|
| | CHANNEL STATE INFOR- MATION | IS BASE STATION A SERVING BASE STATION? (1/0) | CHANNEL STATE INFOR- MATION | IS BASE STATION A SERVING BASE STATION? (1/0) | CHANNEL STATE INFOR- MATION | IS BASE STATION A SERVING BASE STATION? (1/0) | CHANNEL STATE INFOR- MATION | IS BASE STATION A SERVING BASE STATION? (1/0) |
| TERMINAL 1 | 2.0 | 1 | 0.4 | 0 | 0 | 0 | 0.9 | 0 |
| TERMINAL 2 | 0.1 | 0 | 0.5 | 0 | 0.7 | 0 | 2.1 | 1 |
| TERMINAL 3 | 0.8 | 0 | 1.9 | 1 | 0.5 | 0 | 0.2 | 0 |
| TERMINAL 4 | 0.3 | 0 | 0 | 0 | 2.6 | 1 | 0.6 | 0 |
| TERMINAL 5 | 1.2 | 1 | 0 | 0 | 1.3 | 0 | 0 | 0 |

US 8,942,757 B2

DEVICE AND METHOD FOR BASE STATIONS DYNAMIC CLUSTERING IN MOBILE COMMUNICATION

TECHNICAL FIELD

The present invention relates to a facility and a method for providing a service on a mobile communication network, and more particularly to a facility and a method for performing the dynamic clustering of base stations using a centralized clustering server to support an efficient multi-BSs coordination service in a mobile communication system. The mobile communication network mentioned here refers to a mobile communication system that supports the multi-BSs coordination service.

BACKGROUND ART

Coordinated multi-point transmission/reception (CoMP) is already recognized as a very efficient method for extending the coverage of a high-speed data service, improving the throughput at a cell boundary, and increasing the average throughput of the system in a mobile network. In coordinated multi-point transmission/reception, it is required that clustering be performed for all network nodes that participate in the cooperation and a network node in each cluster offers the coordinated multipoint service to multiple terminals. FIG. 1 is a diagram showing a simple multi-BSs coordination service scene in a conventional mobile network. In FIG. 1, two base stations, base station 1 and base station 2, coordinate with each other to provide services to terminal 1 and terminal 2 at the same time. In a practical application, two or more base stations sometimes provide services to two or more terminals at the same time.

3GPP, an international standardization organization, developed the system architecture and the specifications of the second-generation and third-generation mobile communication network, and those specifications are already used today for networks that use the air interface. 3GPP is now working on establishing standards for Long Term Evolution-advanced (LTE-advanced) for a fourth-generation mobile communication network. In the standard establishment process of LTE-advanced, coordinated multi-point transmission/reception is already employed as a service of the multi-BSs coordination service.

FIG. 2 is a diagram showing the frame of the multi-BSs coordination service system that performs centralized control in the conventional technology. In the description below, the LTE-advanced network established by the 3GPP standardization organization is used an example of application. The facility and the method of this network may be applied to other mobile networks that support the multi-BSs coordination service. In this typical frame, the mobile cellular network is composed of at least multiple base stations. The multiple base stations connect to one base station controller (or multiple base station controllers in an actual application), which negotiates about the key parameters of the multi-BSs coordination service. The access network connects the base station controller and the base stations to the mobile network gateway. The mobile network gateway, connected to the Internet or other servers, acts as an end node of the entire mobile access network. The mobile network gateway at least provides the information, received from other servers and the Internet, to all mobile terminals and at least performs processing, such as network registration, security, and cost calculation, for all mobile terminals.

The multi-BSs coordination service has many advantages. However, for each base station to select the optimal base station cluster dynamically and individually, a large amount of data and channel state information must be shared among all base stations. This greatly increases the load of communication among base stations and, at the same time, requires the base stations to implement a complicated algorithm for selecting the optimal cluster. In addition, to select the optimal base station cluster, a large amount of information must be shared between base stations and between a base station and a terminal. This significantly consumes the signaling and resources and decreases the power of the mobile network.

From another viewpoint, if static base station clustering is used in the multi-BSs coordination service such as that shown in FIG. 3, the consumption of the signaling and resources can be saved. However, because the mobile terminal locations and the service channel state are constantly changing in a mobile network, it is difficult to satisfy all the needs of the multi-BSs coordination transmission by selecting static optimal-base station clustering. Simple static base station clustering, though simple, prevents the air interface utilization from being increased using the multi-BSs coordination service, making the multi-BSs coordination service meaningless.

FIG. 3 is a diagram showing an example of static clustering in the conventional multi-BSs coordination service. In the figure, multiple base stations 1-30 are installed in the network, and the base stations are divided statistically into multiple base station clusters with three base stations in each cluster. When the multi-BSs coordination service is performed, only three base stations in a cluster can coordinate with each other but the coordination service cannot be performed across clusters. The advantage of this configuration is that the consumption of a base station caused by dynamic clustering is reduced. In this case, however, the performance cannot reach the optimal level. If a mobile terminal is located around the cell boundary of several base stations in the same base station cluster, the mobile terminal can receive the benefit from the multi-BSs coordination service. If a mobile terminal is located around the boundary between two base stations, for example, around the boundary between the neighboring cells of the base station 2 and the base station 4 in FIG. 3, the base station 2 and the base station 4 cannot perform the multi-BSs coordination service because of the static clustering rule. Therefore, even if these two base stations have enough resources and good channel quality, the mobile terminal cannot receive such a service. Those situations described above are disadvantageous for optimally using the radio air-interface resources of a base station.

In summary, a simpler, lower-consumption solution for selecting dynamic base station clustering is required in a mobile network that supports multi-BSs coordination transmission. The solution is required to find the optimal base station clustering result more quickly and, at the same time, to reduce the consumption of the signaling and resources for calculating base station clustering.

Patent Literature 1 and Patent literature 2 disclose a method that, before the communication between a cluster, composed of multiple radio nodes, and the node at the other end of communication is started, they communicate with each other to negotiate about multi-node coordination communication. However, those nodes are all terminal nodes and the mobile communication base station does not participate in clustering.

Patent Literature 3 discloses a method that the antenna units from two or more base stations configure a multi-antenna array. However, in this patent, the base station cluster is already established and a detailed clustering method is not mentioned.

Patent Literature 4 discloses a method that two transmission nodes coordinate with each other to communicate with one reception node, but the detailed contents of the clustering algorithm is not mentioned.

CITATION LIST

PATENT LITERATURE 1 WO2008/157147A1
PATENT LITERATURE 2 US2008/0014884A1
PATENT LITERATURE 3 US2008/02060064A1
PATENT LITERATURE 4 US2008/003022A3

SUMMARY OF INVENTION

Technical Problem

The present invention provides a communication control device, communication control method, and system and provides a highly efficient multi-BSs coordination service using dynamic clustering in a mobile communication system.

Advantageous Effects of Invention

The present invention selects the optimal base station clustering, based on the communication state between a terminal and each base station, to reduce the consumption of the signaling and resources for calculating base station clustering.

BRIEF DESCRIPTION OF DRAWINGS

FIG. 6 is a signaling flowchart showing dynamic clustering.

FIG. 7 is a flowchart showing dynamic clustering in a centralized clustering server of the present invention.

FIG. 8 is a typical signaling flowchart showing the multi-BSs coordination service triggered by a terminal after the dynamic clustering of the present invention is performed.

FIG. 9 is a typical signaling flowchart showing the multi-BSs coordination service triggered by a base station after the dynamic clustering of the present invention is performed.

FIG. 10 is a diagram showing the basic format of the signaling transmitted between base stations in the present invention.

FIG. 11 is a diagram showing an implementation example of the X2AP field of a request signaling used for coordination transmission negotiation among base stations in the present invention.

FIG. 12 is a diagram showing an implementation example of the X2AP field of a response signaling used for coordination transmission negotiation among base stations in the present invention.

FIG. 13 is a diagram showing the internal structure of a single-antenna base station of the present invention.

FIG. 16 is an information flowchart showing the internal part of the centralized clustering server of the present invention.

FIG. 17 is a diagram showing the typical structure of a channel state information table in the centralized clustering server of the present invention.

FIG. 20 is a diagram showing an implementation example after some mobile terminals have moved in the communication control system of the present invention.

FIG. 21 is a diagram showing the channel state information table after some mobile terminals have moved in the communication control system of the present invention.

DESCRIPTION OF EMBODIMENTS

The following describes embodiments based on a 3GPP LTE-A communication system. The present invention is applicable also to other mobile communication networks that support multi-BSs coordination service.

Figure 1:
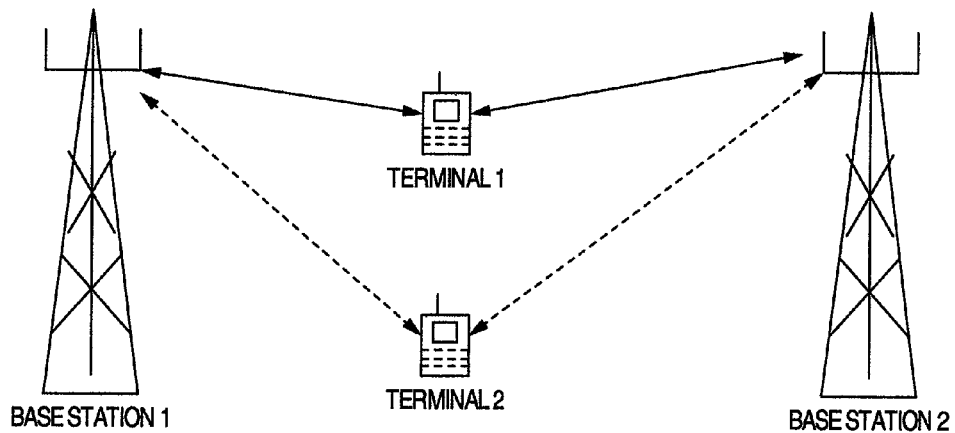
FIG. 1 is a diagram showing a conventional, simple multi-BSs coordination service scene.
Figure 2:
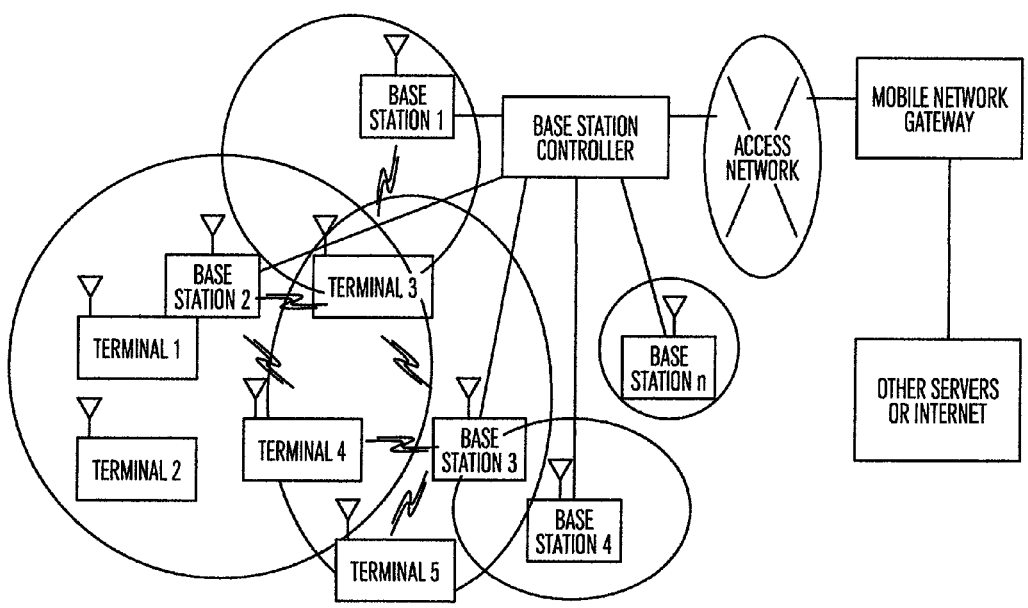
FIG. 2 is a diagram showing the frame of a conventional, multi-BSs coordination service system that is centrally controlled.
Figure 3:
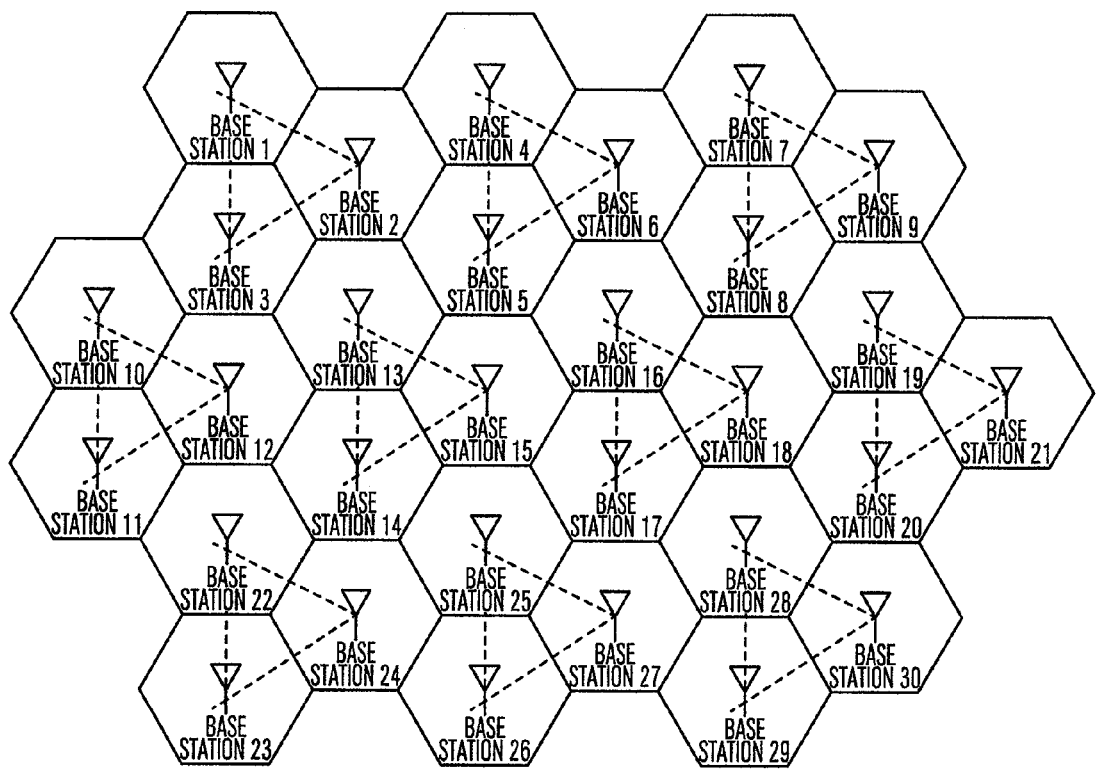
FIG. 3 is a diagram showing an example of static clustering in the conventional multi-BSs coordination service.
Figure 4:
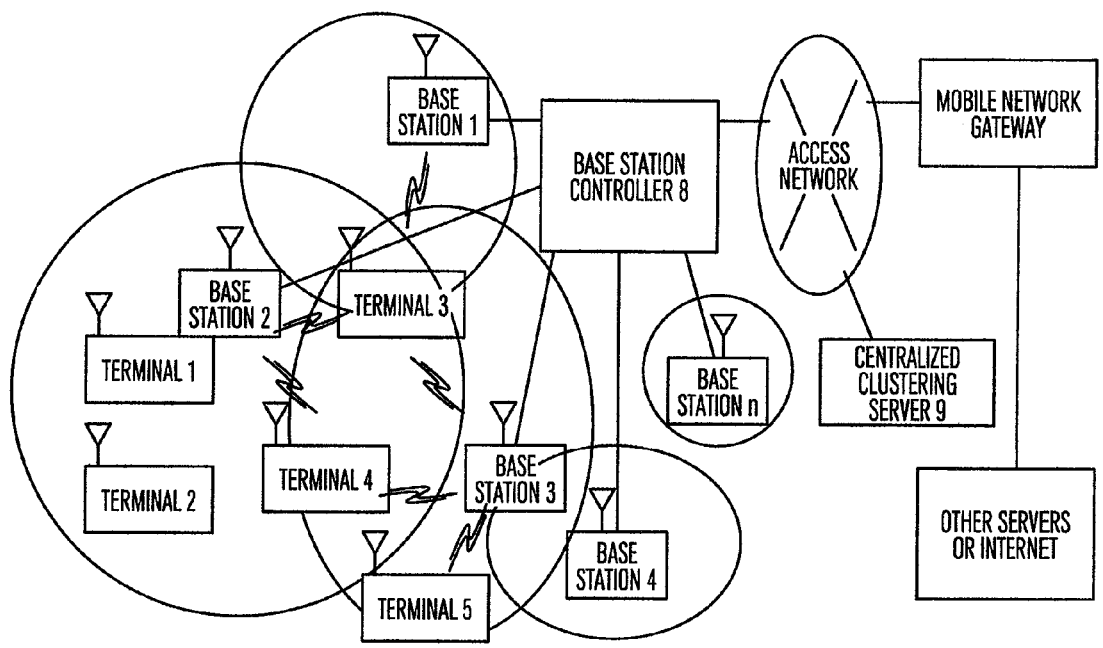
FIG. 4 is a diagram showing a multi-BSs coordination service system that supports centralized dynamic clustering of the present invention.

FIG. 4 is a frame diagram showing a multi-BSs coordination service system of the present invention that supports centralized dynamic clustering. This system is an example of application based on the LTE-advanced network in FIG. 2 that is defined by the 3GPP standardization organization. The centralized clustering server of the present invention may be a centralized clustering server 9, installed standalone in the network, or a base station controller 8 added to an existing base station controller and having the dynamic clustering function. The centralized clustering server of the present invention, which will be described later, may be installed in one of these two installation modes. In the present invention, to upgrade a conventional base station, the basic single-base-station radio service or the multi-BSs coordination radio service must be supported in any case. As shown in FIG. 4, a base station receives a channel state information vector from each terminal and transmits it to the centralized clustering server or transforms channel state information to simpler channel state information and transmits it to the centralized clustering server. The centralized clustering server uses the channel state information on each terminal, received from each base station, to perform clustering for each base station and transmits the clustering result to each base station. A base station negotiates with other base stations in the current base station cluster based on the dynamic clustering result to implement the multi-BSs coordination radio service.

Figure 5:
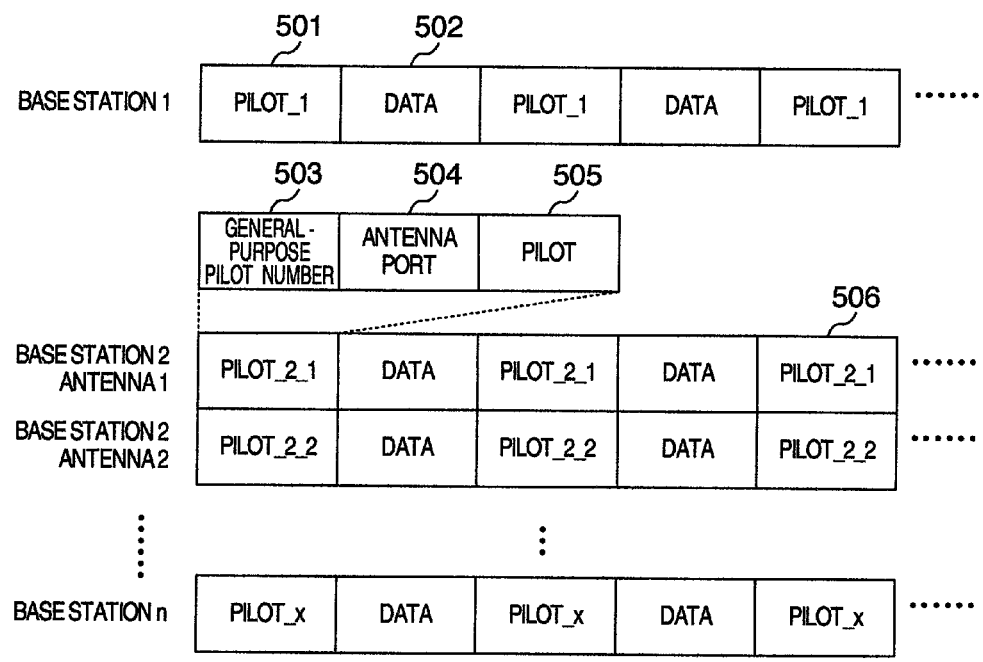
FIG. 5 is a diagram showing the packet format of pilot information used for estimating channel state information.

FIG. 5 is a diagram showing the packet format of pilot information used for estimating channel state information. For a single-antenna base station (base station 1 in the figure), a known, predefined pilot_1 501 must be added periodically to the downlink control channel link. The terminal can use the information in the pilot_1 501 to calculate the channel state information between the terminal and the base station. Other air-interface resources may be used for the transmission of downlink data 502. For a multi-antenna base station (for example, two-antenna base stations 1 and 2 in the figure), an optional general-purpose pilot number 503 may be added and, at the same time, antenna port information 504 and general-purpose pilot information 505 may be added. A pilot_2_1 506 and a pilot_2_2 506, which are transmitted from respective antennas, may be transmitted separately, and the terminal can use the information in the pilot_2_1 506 and the pilot_2_2 506 to calculate the channel state information between the terminal and each of the antennas of the multi-antenna base station.

The contents of pilot information are a known training sequence shared in advance among all terminals and the base station. When pilot information used for channel estimation transmitted from a base station is received, the terminal compares the received pilot information with the already-shared pilot. Because the pilot contents transmitted via a radio channel and the known pilot contents locally stored in the terminal usually differ, the terminal compares the differences to estimate the channel state information. The obtained channel state information includes at least the channel attenuation state and the phase shift state from the terminal to the base station.

FIG. 6 is a signaling flowchart showing dynamic clustering. First, all terminals 1-*m* periodically receive pilot information from respective serving base stations 1-*n* (step 601). After that, the terminal starts calculating the channel state information $h_{ij}$ ($h_{ij}$ indicates the channel state information between base station i and terminal j) corresponding to the base station (step 602). The channel state information in this case is usually expressed in complex number form. Because the calculation of channel state information based on pilot information is a known technology for those skilled in the art, the detailed description is omitted here. Next, each terminal j generates its own channel state information vector [$h_{1j}$, $h_{2j}$, ..., $h_{nj}$] and reports the generated vector to the respective serving base station (step 603). Some of channel state information $h_{ij}$ is 0. All base stations report the respective channel state information to the centralized clustering server (step 604). The reported channel state information may be the original channel state information or simple channel state information. The simple channel state information in this case refers to the state information generated by taking the absolute value of the original channel state information. After receiving the reported channel state information, the centralized clustering server first updates the channel state information table (step 605). When the timer of dynamic clustering times out, the centralized clustering server performs dynamic clustering scheduling (step 606). When the scheduling is terminated, the centralized clustering server transmits the scheduling result to all base stations (step 607). The base station broadcasts the current cluster state to all terminals in its cell (step 608). A terminal or a base station, which triggers the use of the multi-BSs coordination service, follows the current clustering status (step 609). After that, the terminal calculates the channel state information based on the pilot information that is broadcast periodically from each base station, and provides the channel state information for the next clustering.

FIG. 7 is a flowchart showing dynamic clustering in the centralized clustering server of the present invention. The centralized clustering server (communication control device) receives all simple channel state information from the base stations and updates the channel state information table (step 701). If clustering scheduling must be performed, the centralized clustering server configures the channel state information matrix, such as the one shown in mathematical expression 1 based on the channel state information table (step 702).

[MATH. 1]

$$\begin{matrix} H^*_{11} & H^*_{21} & \dots & H^*_{n1} \\ H^*_{12} & H^*_{22} & \dots & H^*_{n2} \\ \dots & \dots & \dots & \dots \\ H^*_{1n} & H^*_{2n} & \dots & H^*_{nn} \end{matrix} \quad (1)$$

In the expression, $H^*_{xy}$ is a collection of simple channel state information between all mobile terminals that receive services from the base station y and the base station x.

There are many collection methods. For example, when dynamic clustering scheduling is performed for each multi-BSs service time slot, the following method is used.

$$H^*_{xy} = |h_{xj}|$$

where $h_{xj}$ is the channel state information between the mobile terminal j that receives services from the current base station y and the base station x.

When the period of dynamic clustering scheduling is equal to multiple multi-BSs service time slots, $H^*_{xy}$ can be calculated as the average or the weighted average of the absolute values of channel state information between all mobile terminals that receive services from the base station y and the base station x in this period.

Based on the channel state information matrix, the centralized clustering server calculates the interference weight $w_{xy}$ that, between base stations, the other base station has on the terminals to which the services are provided by this base station, using mathematical expression 2 to configure the base station interference relation map (step 703).

[MATH. 2]

$$w_{xy} = |H^*_{xy}|^2 + |H^*_{xy}|^2 \quad (2)$$

The interference relation map is an undirected graph. The number of nodes in the graph matches the number of base stations participating in dynamic clustering scheduling, with each node corresponding to one of the base stations. The weight of the boundary between nodes is the interference weight $w_{xy}$ between the corresponding two base stations.

The centralized clustering server calculates all clustering parameters Li based on the number of base stations of each cluster and arranges all clustering possibilities in the un-scheduling list in descending order of the clustering parameters (step 704). The calculation of the clustering parameter Li corresponding to one base station clustering possibility follows the principle defined by mathematical expression 3.

[MATH. 3]

$$Li = \sum_{ab} w_{ab} \quad (3)$$

In the expression, $w_{ab}$ is the interference weight between the base stations defined by mathematical expression 2. One of the base stations (a or b) belongs to the current base station cluster, and the other base station does not belong to the current base station cluster.

The number of base stations in each base station cluster may be set in advance in the centralized clustering server or may be determined dynamically according to some principle.

After that, the centralized clustering server starts dynamic clustering scheduling. The scheduling is based on assumption that the interference weight $w_{xy}$ among all base stations in the same base station cluster will contribute to a channel gain in the multi-BSs coordination service. However, when two base stations are not in the same base station cluster, the interference weight $w_{xy}$ between the two base stations will contribute to the channel interference of the multi-BSs coordination service. For example, when base station y and base station x are in the same base station cluster for $h^{*}_{xy}$, base station y and base station x can perform the multi-BSs coordination service, and all channel gains between all mobile terminals, to which base station y provides services, and base station x are the channel gain in the coordination service. When base station y and base station x are not in the same base station cluster, base station y and base station x cannot perform the multi-BSs coordination service, and all channel gains between all mobile terminals, to which base station y provides services, and base station x are all channel interference to the coordination service that is performed for each of those two base stations. Therefore, the goal of dynamic base station clustering is to find the optimal clustering method, to minimize channel interference between the base station clusters, and to maximize the channel gain.

The basic scheduling process is as follows.

First step 705: Initialize un-clustered set E to all base station nodes and initialize the clustered base station set U to a null set Φ.

Second step 706: Select the clustering set θ currently having the minimum clustering parameter Li, check if θ∉U and, if the result is "yes", pass control to the third step 707 and, if the result is "no", pass control to the fifth step.

Third step 707: E=E−θ, U=U+θ

Fourth step 708: Select the clustering set θ, currently having the minimum clustering parameter, as efficient clustering.

Fifth step 709: Delete the clustering set θ, currently having the minimum clustering parameter, from the original un-scheduling list.

Sixth step 710: Determine if E=Φ or if the number of remaining base stations in the un-clustered set E is smaller than the number of base stations in the currently established base station cluster and, if the result is "yes", pass control to the seventh step and, if the result is "no", return to the second step 706.

Seventh step 711: Terminate clustering scheduling and transmit the clustering result to all base stations.

FIG. 8 is a typical signaling flowchart showing the multi-BSs coordination service triggered by a terminal after the dynamic clustering of the present invention is performed. Assume that, at some particular time, the dynamic clustering result of the base stations is already transmitted to all base stations via the centralized clustering server (step 801). The base station transmits the dynamic base station clustering result to a corresponding terminal (step 802). When the terminal determines to use the multi-BSs coordination service of the current cluster (step 803), the terminal transmits a message to the corresponding serving base station to trigger the multi-BSs coordination service (step 804). The serving base station is able to select a step for giving related permission (step 805). In this step, the terminal periodically reports the channel state information, generated between the terminal and all base stations in the current base station cluster, to the serving base station (step 806). When it is determined that the multi-BSs coordination service can be performed for the terminal, the serving base station negotiates with other base stations in the current base station cluster about the coordination transmission (step 807). When the negotiation is successful, the serving base station notifies the terminal about the coordination transmission key parameters (step 808). All base stations in the current base station cluster allocate resources and establish the related setting based on the negotiation result (step 809). In this way, the multi-BSs coordination service is performed between all base stations in the current base station cluster and the corresponding terminal (step 810). For the next dynamic clustering scheduling, the base station must periodically report simple channel state information to the centralized clustering server (step 811).

FIG. 9 is a typical signaling flowchart showing the multi-BSs coordination service triggered by a base station after the dynamic clustering of the present invention is performed. Assume that, at some particular time, the dynamic clustering result of the base stations is already transmitted to all base stations via the centralized clustering server (step 901). The base station selects to transmit the dynamic base station clustering result to a corresponding terminal (step 902). When the serving base station determines to use the multi-BSs coordination service of the current cluster (step 903), the serving base station transmits a message to the corresponding terminal to trigger the multi-BSs coordination service (step 904). In this step, the terminal periodically reports the channel state information, generated between the terminal and all base stations in the current base station cluster, to the corresponding serving base station (step 905). When it is determined that the multi-BSs coordination service can be performed for the terminal, the serving base station negotiates with other base stations in the current base station cluster about the coordination transmission (step 906). When the negotiation is successful, the serving base station notifies the terminal about the coordination transmission key parameters (step 907). All base stations in the current base station cluster allocate resources and establish the related setting based on the negotiation result (step 908). In this way, the multi-BSs coordination service is performed between all base stations in the current base station cluster and the corresponding terminal (step 909). For the next dynamic clustering scheduling, the base station must periodically report simple channel state information to the centralized clustering server (step 910).

FIG. 10 is a diagram showing the basic format of the signaling transmitted between base stations in the present invention. The signaling, an SCTP/IP data packet, may be used in both IPv4 and IPv6. In a general-purpose IP packet head 1001, the target address is a target base station IPv4/IPv6 address 1002 and the origin address is an origin base station IPv4/IPv6 address 1003. The general-purpose IP packet head 1001 is followed by the general-purpose SCTP packet head. The last field contains a message body 1005 conforming to the 3GPP X2AP protocol.

FIG. 11 is a diagram showing an implementation example of the X2AP field 1005 of a request signaling used for coordination transmission negotiation among base stations in the present invention. The information units to be prepared include the following. 1) Message type unit 1101. The value of this unit, defined by a standardization organization such as 3GPP, must identify a multi-BSs coordination request function. 2) X2AP protocol number corresponding to the terminal of the serving base station 1102. This number uniquely identifies one terminal in the direction from the serving base station to the target base station. 3) Target base station number 1103. 4) Related cell ID of target base station 1104. 5) Multi-BSs coordination service request type 1105 (start, end, etc.). 6) Contents of request report 1106. This field is a 32-bit bit sequence, with each bit corresponding to one piece of information content. The numeric value 1 of this bit indicates that the target base station must add corresponding information to the response message (For example, the first bit corresponds to the pre-coding option, the second bit corresponds to the output power of the coordination service, and the third bit corresponds to the modulation rate, and so on). 7) Channel state information generated between the target base station and the corresponding terminal 1108. The optional information includes the following. 1) Information reporting period between the target base station and the serving base station 1107. 2) Other several pieces of optional information 1109.

FIG. 12 is a diagram showing an implementation example of the X2AP field of a response signaling used for coordination transmission negotiation among base stations in the present invention. The information units to be prepared include the following. 1) Message type unit 1201. The value of this unit, defined by a standardization organization such as 3GPP, must identify a multi-BSs coordination request function. 2) X2AP protocol number corresponding to the terminal of the serving base station 1202. This number uniquely identifies one terminal in the direction from the serving base station to the target base station. 3) X2AP protocol number corresponding to the terminal of the target base station 1203. This number uniquely identifies one terminal in the direction from the from the target base station to the serving base station. 4) Related cell ID of target base station 1204. 5) Multi-BSs coordination service request type 1205 (start, end, etc.) must match the contents of the corresponding information unit in the X2AP request message. 6) Contents of response report 1206. This field is a 32-bit bit sequence, with each bit corresponding to one piece of information content. The numeric value 1 of this bit indicates that the target base station has added corresponding information to the response message. The contents must match the contents of the corresponding information unit in the X2AP request message. The optional information includes the following. 1) Information reporting period between the target base station and the origin base station 1207. 2) Pre-coding options 1208. 3) Coordination transmission power 1209. 4) Modulation rate 1210. 5) Other several pieces of optional information 1211.

FIG. 13 is a diagram showing the internal structure of a single-antenna base station of the present invention. The internal structure of the base station mainly includes the following: high-frequency module 1322, baseband module 1307, high-layer signaling and control unit 1308, network interface module 1309 connected to the access network, multi-BSs service control unit 1311 that controls communication with the multi-BSs service and the centralized clustering server, network module 1310 that communicates with the centralized clustering server, channel state information matrix 1325, pre-coding option 1326, and channel estimation unit 1318. The high-frequency module 1322 includes at least one physical antenna 1301, one or more high-frequency multiplexing units 1302, and one or more radio frequency units 1303. The downlink part of the high-frequency module 1322 includes a coordination pre-coding unit 1304, a downlink pilot generation unit 1305, at least one multi-layer mapping unit 1306, a downlink time-division control unit 1319, and a transmission frequency control part 1314. The downlink part of the high-frequency module 1322 includes a coordination decoding unit 1321, an uplink training sequence analysis unit 1305, at least one multi-layer de-mapping unit 1316, and an uplink time-division control unit 1320. The baseband part includes at least one channel coding and modulation module 1312 and at least one channel decoding and demodulation module 1313.

Figure 14:
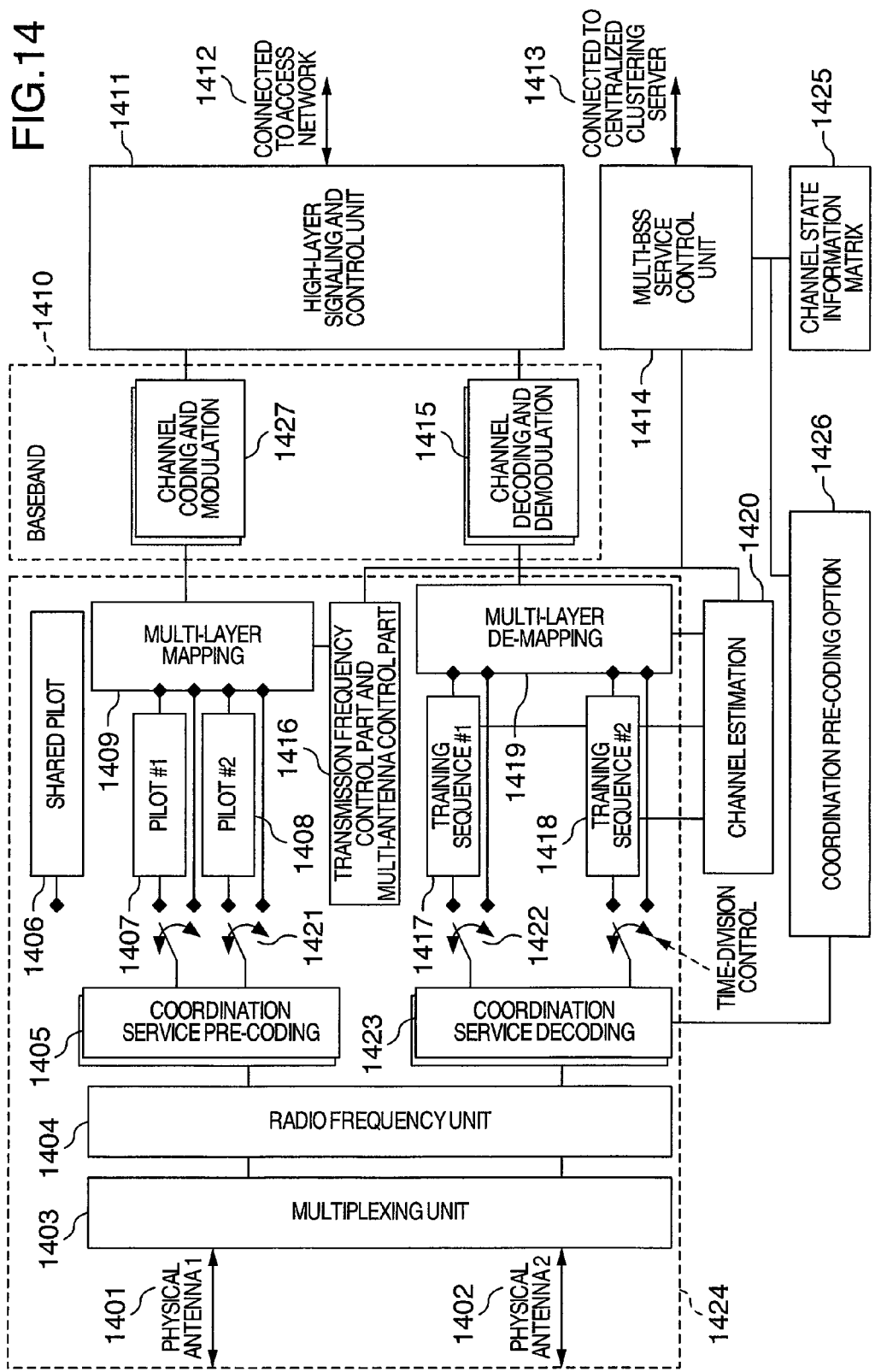
FIG. 14 is a diagram showing an example of the internal structure of a multi-antenna base station of the present invention (two antennas).

FIG. 14 is a diagram showing an example of the internal structure of a multi-antenna base station of the present invention (two antennas). The internal structure of the base station mainly includes the following: high-frequency module 1424, baseband module 1410, high-layer signaling and control unit 1411, a network interface module 1412 connected to the access network, multi-BSs service control unit 1414 that controls the communication with the multi-BSs service and the centralized clustering server, network module 1413 that communicates with the centralized clustering server, channel state information matrix 1425, pre-coding option 1436, and channel estimation unit 1420. The high-frequency module 1424 includes at least two physical antennas 1401 and 1402, one or more high-frequency multiplexing units 1403, and one or more radio frequency units 1404. The downlink part of the high-frequency module 1424 includes at least one coordination pre-coding unit 1405, at least two downlink pilot generation units 1407 and 1408, at least one multi-layer mapping unit 1409, at least one shared pilot generation unit 1406, at least two downlink time-division control units 1421, and a transmission frequency control part and multi-antenna control part 1416. The downlink part of the high-frequency module 1424 includes at least one coordination decoding unit 1423, at least two uplink training sequence analysis units 1417 and 1418, at least one multi-layer de-mapping unit 1419, and at least two downlink time-division control units 1422. The baseband part includes at least two channel coding and modulation modules 1427 and at least two channel decoding and demodulation modules 1415.

Figure 15:
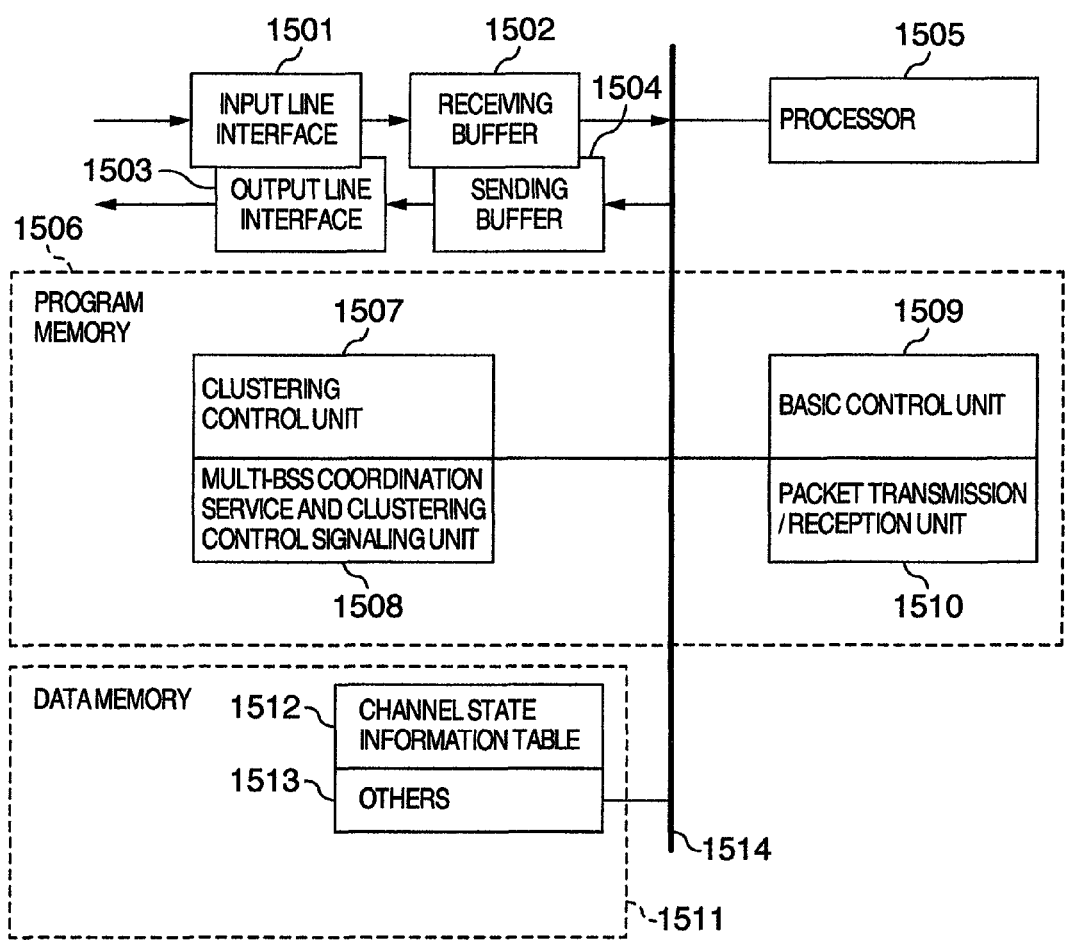
FIG. 15 is a diagram showing the typical structure of the internal part of the centralized clustering server of the present invention.

FIG. 15 is a diagram showing the typical structure of the internal part of the centralized clustering server, that is, the communication control device, of the present invention. The network interface includes an input line interface 1501 and an output line interface 1503. At the same time, the network interface further includes a receiving buffer 1502 and a sending buffer 1504. Each receiving buffer is connected to the input line interface 1501 and an internal bus 1514, and each sending buffer is connected to the output line interface 1503 and the internal bus 1514. In addition, the internal bus 1514 is further connected at least to a processor 1505, a program memory 1506, and a data memory 1511. The program memory 1506 saves the functional modules to be executed by the processor 1505, including at least a packet transmission/reception unit 1510, a clustering control unit 1507 that mainly controls the scheduling of dynamic base station clustering, multi-BSs coordination service and clustering control signaling unit 1508 (CoMP signaling control module), and a basic control unit (basic control routine) 1509 for selecting the startup of other modules. The data memory 1511 saves a channel state information table 1512 newly added by the present invention and other several pieces of data information 1513.

The main module newly added to the program memory 1506 of the present invention is the clustering control unit 1507. The detailed function of the clustering control unit 1507 is as follows.

1. When channel state information reports are received from the base stations, the clustering control unit 1507 updates the channel state information table 1512 with the reported channel state information. When the report from a base station is the original channel state information, the clustering control unit 1507 transforms the original channel state information to simple channel state information and, after that, saves it in the channel state information table 1512.

2. The clustering control unit 1507 acquires the dynamic clustering scheduling timer and, when the timer times out, newly performs dynamic clustering scheduling.

3. The number of base stations in a base station cluster is set. The number of base stations may be set manually by the provider or may be set dynamically by some other method.

4. The clustering control unit 1507 performs scheduling according to the method shown in FIG. 7 when dynamic clustering scheduling is performed.

5. The clustering control unit 1507 transmits the scheduling result to all base stations after scheduling is terminated.

6. The method by which the clustering control unit 1507 communicates with other network facilities via the multi-BSs coordination service and clustering control signaling unit 1508 is as shown in FIG. 6.

In addition, the multi-BSs coordination service and clustering control signaling unit 1508 is newly added to the program memory 1506 to carry out signaling communication with other network facilities. The multi-BSs coordination service and clustering control signaling unit 1508 must at least transfer the report from each base station to the clustering control unit 1507 and, in addition, must transmit the dynamic base station clustering scheduling result of the clustering control unit 1507 to all base stations.

The main module newly added to the data memory 1511 of the present invention is the channel state information table 1512. The detail of the table is as shown in FIG. 17. It contains information on a terminal 1701 and each base station 1702 such as the channel state information and the serving base station. The clustering control unit 1507 receives the reports from the base stations, collects the reports, and updates the table. At the same time, the clustering control unit 1507 performs dynamic base station clustering scheduling by referencing the contents of the table.

FIG. 16 is an information flowchart showing the internal part of the centralized clustering server of the present invention. Simple channel state information 1601, transmitted periodically from each base station, is received first by the input line interface 1501 and the receiving buffer 1502 and, via the bus 1514, reaches the packet transmission/reception unit 1510. The packet transmission/reception unit 1510 transfers the channel state information 1601 to the multi-BSs coordination service and clustering control signaling unit 1508. After the session control is performed, the information is transmitted to the clustering control unit 1507 and then is saved in the channel state information table 1512. If it is required to perform dynamic clustering scheduling, the clustering control unit 1507 acquires the current channel state information 1601 from the channel state information table 1512, performs dynamic clustering scheduling, and transfers a base station clustering result 1602 to the multi-BSs coordination service and clustering control signaling unit 1508. After the session control is performed, the information is transmitted to the packet transmission/reception unit 1510 and is transmitted via the output line interface 1503 and the output buffer 1504. Finally, the base station clustering result 1602 is transmitted to all base stations via the network. All data and signaling flows in the centralized clustering server are controlled by the processor 1505 via a basic control unit 1509 and are transferred via the data or control bus 1514.

FIG. 17 is a diagram showing the typical structure of the channel state information table 1512 in the centralized clustering server of the present invention. The table is present in the data memory 1511 of the centralized clustering server. Each of the rows 1706 of the channel state information table 1512, which corresponds to one mobile terminal, includes the number of the terminal 1701. The terminal has multiple table items 1702 each of which represents the channel state information and the serving relation with each base station. Each of the table items 1702 includes simple channel state information 1704 and a serving relation 1705 with the base station corresponding to the terminal.

The following describes a simple application example composed of four base stations and five mobile terminals. If each base station has only one antenna, only one terminal can be served at the same time. At the same time, assume that the network between a base station and the centralized clustering server can support dynamic base station clustering scheduling that is accurate enough to perform scheduling on a time slot basis.

Figures 18, 19:
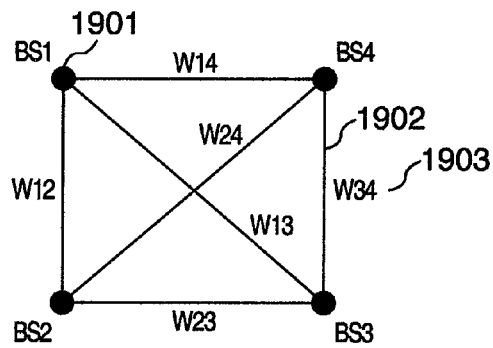
FIG. 18 is a diagram showing an implementation example of the channel state information table in the centralized clustering server of the present invention.
FIG. 19 is a diagram showing an implementation example of the interference relation map used for the dynamic clustering algorithm of the present invention.

FIG. 18 is a diagram showing an implementation example of the channel state information table 1512 (FIG. 17) in the centralized clustering server of the present invention. Each of the rows 1806 corresponds to one mobile terminal and includes the number of the terminal 1801. The terminal has multiple table items 1802 each of which represents the channel state information and the serving relation with each base station. Each of the table items 1802 includes simple channel state information 1804 and a serving relation 1805 with the base station corresponding to the terminal.

Assume that a base station 17 provides services only to a terminal 12 in one time slot. In this case, the simple channel state information matrix H, which is generated based on the contents of the channel state information table 1512 in FIG. 18, is as follows.

$$\begin{matrix} 2.0 & 0.4 & 0 & 0.9 \\ 0 & 2.4 & 0.7 & 0 \\ 0 & 0.9 & 2.2 & 0 \\ 0.8 & 0 & 1.6 & 2.5 \end{matrix}$$

The interference relation map, such as the one shown in FIG. 19, can be generated based on this matrix. FIG. 19 is a diagram showing an implementation example of the interference relation map used for the dynamic clustering algorithm of the present invention. The generated interference relation map is an undirected graph in which each node 1901 corresponds to one base station, a side 1902 between each two nodes corresponds to the interference relation between the two base stations, and the weight is an interference weight 1903 of the two base stations. The interference relation map is generated by the clustering control unit 1507 of the centralized clustering server based on the contents of the current channel state information table 1512. The calculation result of all current interference weights 1903 in FIG. 19 is as follows.

$W_{12}=0.16, W_{13}=0; W_{14}=1.45;$ $W_{23}=1.3; W_{24}=0; W_{12}=1.45$

Assume that the number of base stations in each base station cluster is 2. In this case, the calculation result of the clustering parameters Li of the possibilities of each base station cluster is as shown in Table 1 (arranged in ascending order).

TABLE 1

| Nodes Permutation | Li |
|---|---|
| 2, 3 | 1.61 |
| 1, 4 | 1.61 |
| 1, 2 | 2.75 |
| 3, 4 | 2.75 |
| 1, 3 | 3.36 |
| 2, 4 | 3.36 |

Finally, the centralized clustering server selects the two base station clusters ({2,3} and {1,4}) as the final result according to the method shown in FIG. 7.

The calculation of the clustering parameters Li for a larger number (p in this case) of base station clusters is the same method shown in FIG. 7. The number of clustering possibilities generated in this way is $C_n^p$. The selection method is also the method shown in FIG. 7.

In the present invention, other methods may be used as the method shown in FIG. 7 for performing dynamic clustering for the base stations based on the channel state information. For example, the centralized clustering server can perform clustering based on the methods described below.

Step 1: The centralized clustering server acquires all simple channel state information from the channel state information table.

Step 2: The server calculates the sum $S_{xy}$ of the simple channel state information on each of other base stations that all terminals served in each base station have for the other base station ($S_{xy}$ indicates the sum of the simple channel state information that all terminals in base station x have for base station y).

Step 3: The server arranges all base stations according to the number of served terminals to configure the un-clustered base station set E and initializes the clustered base station set U to an empty set.

Step 4: For the current number of base station clusters (p in this case), the server selects (p−1) largest $S_{xy}$ base stations from the base station having the largest number of served terminals to form an efficient base station cluster, deletes p base stations in that base station cluster from the un-clustered set E, and adds those base stations to the clustered set U.

Step 5: If the current un-clustered set E is an empty set or if the number of remaining base stations in the current un-clustered set E is smaller than the number of base stations in each base station cluster, control is passed to step 6 and, if not, control is returned to step 4.

Step 6: The server terminates the clustering algorithm and transmits the clustering result to all base stations.

In addition, the centralized clustering server can perform clustering, for example, based on the method described below.

Step 1: The centralized clustering server acquires all original channel state information from the channel state information table.

Step 2: For each terminal, based on the channel state information between the terminal and other non-serving base stations, the server selects (p−1) non-serving base stations, which provides the multi-BSs coordination service to the current terminal and provides the highest radio usage rate, to form the temporary optimal clustering for the current terminal. When the radio usage rate is calculated, the server first calculates the multi-BSs coordination service transmission matrix based on the attenuation and channel shift information in the original channel state information. After that, based on the transmission matrix, the server calculates the radio usage rates at which all base stations in the temporary clustering provide services to the current terminal, and calculates the sum.

Step 3: The server configures all base stations into the un-clustered base station set E, initializes the clustered base station set U to an empty set, and configures all terminals into the terminal set W.

Step 4: The server first selects a clustering, which occurs most as the temporary optimal clustering of all terminals in the terminal set W, as the current efficient clustering, deletes p base stations in that base station cluster from the un-clustered set E, adds those base stations to the clustered set U, and finally deletes all terminals, which select the current cluster as the temporary optimal clustering, from the terminal set W.

Step 5: If the current un-clustered set E is an empty set, or if the number of remaining base stations in the current un-clustered set E is smaller than the number of base stations in each base station cluster, or if the terminal set W is an empty set, control is passed to step 7 and, if not, to step 6.

Step 6: If a clustering, which occurs most as the temporary optimal clustering of all terminals in the terminal set W, can be selected, control is passed to back step 4. If there are two or more selections of temporary optimal clustering that occurs most (assume that there are T selections), the server calculates the sum of the terminal radio usage rates each corresponding to each clustering selection ($S_t$ where t is one of current T temporary optimal clustering selections), selects the temporary optimal clustering selection t having the maximum $S_t$ as the clustering that currently occurs most, and returns control to step 4.

Step 7: The server terminates the clustering algorithm and transmits the clustering result to all base stations.

The following describes how the present invention works in another situation, that is, when some terminals move in the communication control system.

FIG. 20 is a diagram showing an implementation example after some mobile terminals have moved in the communication control system of the present invention. FIG. 21 is a diagram showing the channel state information table after some mobile terminals have moved in the communication control system of the present invention.

In a particular time slot, if terminal 1 does not move and if terminal 2, terminal 3, and terminal 4 have moved to the respective locations in the embodiment described above as shown in FIG. 20, then the contents of the channel state information table are changed to the contents indicated in FIG. 21. The base station 17 provides services only to the terminal 12, and the format of the current base station clustering is the result of dynamic clustering based on the contents of FIG. 18. In this case, the simple channel state information matrix H, generated based on the contents of the current channel state information table in FIG. 21, is as follows.

$$\begin{matrix} 2.0 & 0.4 & 0 & 0.9 \\ 0.8 & 1.9 & 0.5 & 0.2 \\ 0.3 & 0 & 2.6 & 0.6 \\ 0.1 & 0.5 & 0.7 & 2.1 \end{matrix}$$

The interference relation map, such as the one shown in FIG. 19, can be generated based on this matrix. FIG. 19 is a diagram showing an implementation example of the interference relation map used for the dynamic clustering algorithm of the present invention. The generated interference relation map is an undirected graph in which each node 1901 corresponds to one base station, the side 1902 between each two nodes corresponds to the interference relation between the two base stations 7, and the weight is the interference weight 1903 of the two base stations. The interference relation map is generated by the clustering control unit 1507 of the centralized clustering server based on the contents of the current channel state information table 1912. The calculation result of all current interference weights 1903 in FIG. 19 is as follows.

$W_{12}=0.80; W_{13}=0.09; W_{14}=0.82;$ $W_{23}=0.25; W_{24}=0.29; W_{34}=0.85$

Assume that the number of base stations in each base station cluster is 2. In this case, the calculation result of the clustering parameters Li of the possibilities of each base station cluster is as shown in Table 2 (arranged in ascending order).

TABLE 2

| Nodes Permutation | Li |
|---|---|
| 1, 2 | 1.45 |
| 34 | 1.45 |
| 1, 4 | 2.03 |
| 2, 3 | 2.03 |
| 1, 3 | 2.72 |
| 2, 4 | 2.72 |

Finally, the centralized clustering server selects the two base station clusters ({1,2} and {3,4}) as the final result according to the method shown in FIG. 7.

Therefore, even if terminal 1 does not change the location, that is, in the still state, in this situation, the dynamic base station clustering is changed. The dynamic base station clustering method in the present invention is based on the radio link interference among all base stations and the terminals in the current network. Therefore, when the radio channel state of one terminal is not changed but the radio channel state of another terminal is changed, the clustering result may be affected. Even when all terminal locations are not changed but there is a change in the surrounding environment (for example, an obstructing object that temporarily emerges around several terminals affects the channel state between the terminals and the related base stations), the radio channel state is changed and the clustering result is more or less affected. In contrast, the dynamic base station clustering method of the present invention allows a clustering method to be found that is always the optimal in the current channel state.

Figure 22:
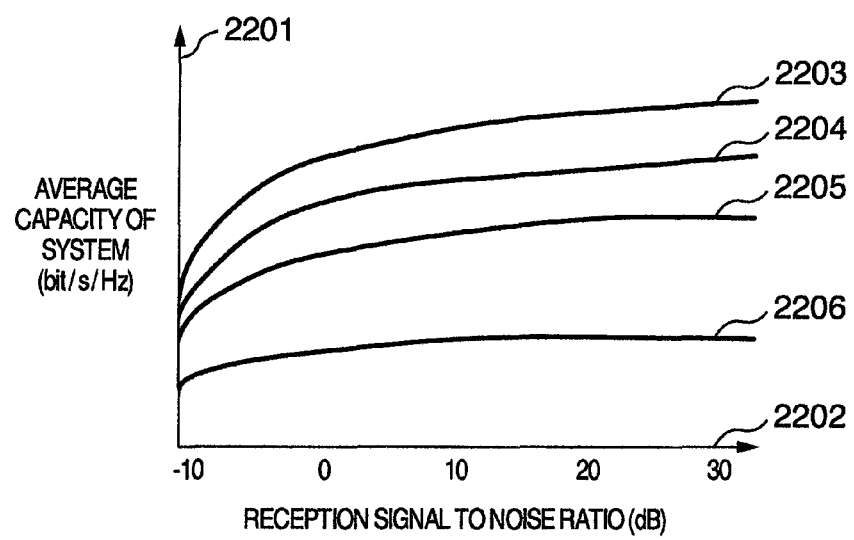
FIG. 22 is a diagram showing the advantage comparison of the dynamic clustering algorithm of the present invention.

FIG. 22 is a diagram showing the comparison of advantage of the dynamic clustering algorithm of the present invention. A horizontal axis 2202 indicates the reception-signal-to-noise ratio SNR in dB, and a vertical axis 2201 indicates the average capacity of the current system in bit/s/Hz. The figure has four curves, with the theoretically optimal curve at the top 2203. The theoretical value is calculated by the Shannon channel capacity formula given below.

Channel capacity/Frequency width=log(1+Signal to interference ratio)

A curve 2204 indicates the average performance when the multi-BSs coordination service is performed after the dynamic clustering of the present invention is performed, a curve 2205 indicates the average performance of the multi-BSs coordination service when static clustering is performed, and a curve 2206 indicates the average performance when the multi-BSs coordination service is not performed.

The dynamic clustering method of the present invention is significantly better in performance than the static clustering method and produces a value closest to the theoretically desired value, and its clustering algorithm is very simple. The curves 2204, 2205, and 2206 are the statistical distribution result obtained by a large number of simulations in a network composed of multiple base stations and multiple terminals.

The mobile terminal of the present invention may be a mobile phone, a notebook PC having the radio online function, or other communication facilities that have the radio communication function.

Advantages of the Present Invention (1) A combination of optimal base station clustering in the current network is dynamically found.

(2) The parameters used for dynamic clustering scheduling are the basic channel state information reported from each terminal to the network side. Therefore, the system and method of the present invention can be supported without changing the conventional terminals.

(3) Because the information reported from the mobile communication base stations to the centralized clustering server is simplified channel state information, the communication bandwidth can be saved.

(4) All scheduling is a calculation carried out based on simplified real-number channel state information, the calculation is performed by four arithmetic operations and the square operation, the amount of calculation is very small, and the calculation is very suitable for implementing hardware. Therefore, dynamic clustering scheduling can be performed based on the granularity of communication time slots.

(5) The clustering method is applicable to various sizes of base station clusters.

(6) The amount of change in the conventional mobile communication base station and terminals is very small.

The invention claimed is:

1. A communication control device, which is linked to a plurality of base stations via a network, performs dynamic clustering for said plurality of base stations to allow the plurality of clustered base stations to coordinate with each other to provide services to mobile terminals, said communication control device comprising:
   an interface that is linked to the plurality of base stations to receive channel state information on mobile terminals from each of said base stations;
   a memory that stores the channel state information on mobile terminals received from said interface; and
   a control unit that performs dynamic clustering for each of said base stations based on the channel state information on mobile terminals stored in said memory,
   wherein, when dynamic clustering is performed by said control unit:
   channel state information between related mobile terminals and all base stations is retrieved from said memory for configuring a channel state information matrix;
   an interference weight between each two of said base stations is calculated based on each element of the channel state information matrix for configuring a dynamic base station clustering diagram;
   clustering parameters of all clustering possibilities are obtained based on a number of base stations in an arranged cluster of the base stations;
   clustering having minimum clustering parameters is continuously performed until all of said base stations belong to a base station clustering and determining possibilities to make the clustering an efficient clustering; and
   the clustering result is transmitted to all of said base stations.

2. The communication control device according to claim 1, wherein
   the channel state information is generated by each mobile terminal by receiving pilot information from each base station and carrying out calculation.

3. The communication control device according to claim 2, wherein said mobile terminal transmits the communication state information, which is transmitted to each base station, to a serving base station in a channel state information vector form.

4. The communication control device according to claim 2, wherein
said base station has one or more physical antennas and said mobile terminal receives the pilot information via the one or more physical antennas of said base station.

5. The communication control device according to claim 1, wherein
said memory stores a channel state information table that includes a mobile terminal number, channel state information between the mobile terminal and all of the mobile communication base stations, and service provision information between the mobile terminal and said all of the base stations and
said control unit determines optimal base station clustering of the mobile terminals based on the channel state information table on the mobile terminals stored in said memory.

6. The communication control device according to claim 5, wherein
the channel state information stored in the channel state information table is original channel state information or simple channel state information, the simple channel state information generated by taking an absolute value of the original channel state information.

7. The communication control device according to claim 5, wherein
when the channel state information is received from the base stations, said interface of the communication control device updates the channel state information table with the received information.

8. The communication control device according to claim 5, further comprising:
a timer that determines a dynamic clustering operation period wherein
each time said timer times out, said control unit of the communication control device performs dynamic base station clustering scheduling.

9. The communication control device according to claim 1, further comprising:
a signaling module that notifies a clustering result to all base stations after a communication connection with the base stations is established and said control unit completes the dynamic clustering for said each of said base stations.

10. The communication control device according to claim 9, wherein
when said base station transmits the clustering result to said mobile terminal, said mobile terminal transmits a message to a corresponding serving base station to trigger a multi-BSs coordination service.

11. The communication control device according to claim 1, wherein
a number of base stations of each base station clustering is set statically or dynamically.

12. A communication method for use in a communication system comprising a plurality of mobile terminals, a plurality of base stations each of which provides services to each mobile terminal, and a communication control device that has a memory in which a channel state information table is stored and performs control for the base stations, said communication method comprising the steps of:

receiving, by said communication control device, channel state information reported by all of the base stations for updating the channel state information table with the received information;
triggering, by said communication control device, dynamic base station clustering scheduling when the dynamic clustering operation timer times out;
retrieving channel state information generated between related mobile terminals and all base stations from said channel state information table for configuring a channel state information matrix;
calculating an interference weight between each two of said mobile communication base stations based on each element of the channel state information matrix for configuring a dynamic base station clustering diagram;
obtaining clustering parameters of all clustering possibilities based on a number of base stations in an arranged cluster of the base stations;
continuously performing clustering having minimum clustering parameters until all of said base stations belong to a base station clustering and determining possibilities to make the clustering an efficient clustering;
transmitting, by said communication control device, the clustering result to all of the base stations to allow the base stations to transfer the clustering result to the mobile terminals; and
providing services, by each base station, to said base station based on the clustering result.

13. A communication system comprising a plurality of mobile terminals, a plurality of base stations that provide services to each mobile terminal, and a communication control device that performs control for the base stations wherein
said mobile terminal periodically transmits communication state information with each base station to said each base station and
said communication control device comprises:
an interface that is linked to the plurality of base stations to receive channel state information on mobile terminals from each of said base stations;
a memory that stores the channel state information on mobile terminals received from said interface; and
a control unit that performs dynamic clustering for each of said base stations based on the channel state information on mobile terminals stored in said memory,
wherein, when dynamic clustering is performed by said control unit,
channel state information between related mobile terminals and all base stations is retrieved from said memory for configuring a channel state information matrix;
an interference weight between each two of said base stations is calculated based on each element of the channel state information matrix for configuring a dynamic base station clustering diagram;
clustering parameters of all clustering possibilities are obtained based on a number of base stations in an arranged cluster of the base stations;
clustering having minimum clustering parameters is continuously performed until all of said base stations belong to a base station clustering and determining possibilities to make the clustering an efficient clustering; and
the clustering result is transmitted to all of said base stations.

* * * * *

UNITED STATES PATENT AND TRADEMARK OFFICE
CERTIFICATE OF CORRECTION

PATENT NO. : 8,942,757 B2
APPLICATION NO. : 13/266898
DATED : January 27, 2015
INVENTOR(S) : Y. Jia et al.

It is certified that error appears in the above-identified patent and that said Letters Patent is hereby corrected as shown below:

ON THE TITLE PAGE

Please correct (30) Foreign Application Priority Data, as follows:

(30) Foreign Application Priority Data

Apr. 30, 2009 (CN) .............................. 2009 1 0132283.4

Signed and Sealed this
Twenty-third Day of June, 2015

Michelle K. Lee
*Director of the United States Patent and Trademark Office*